UNITED STATES PATENT OFFICE.

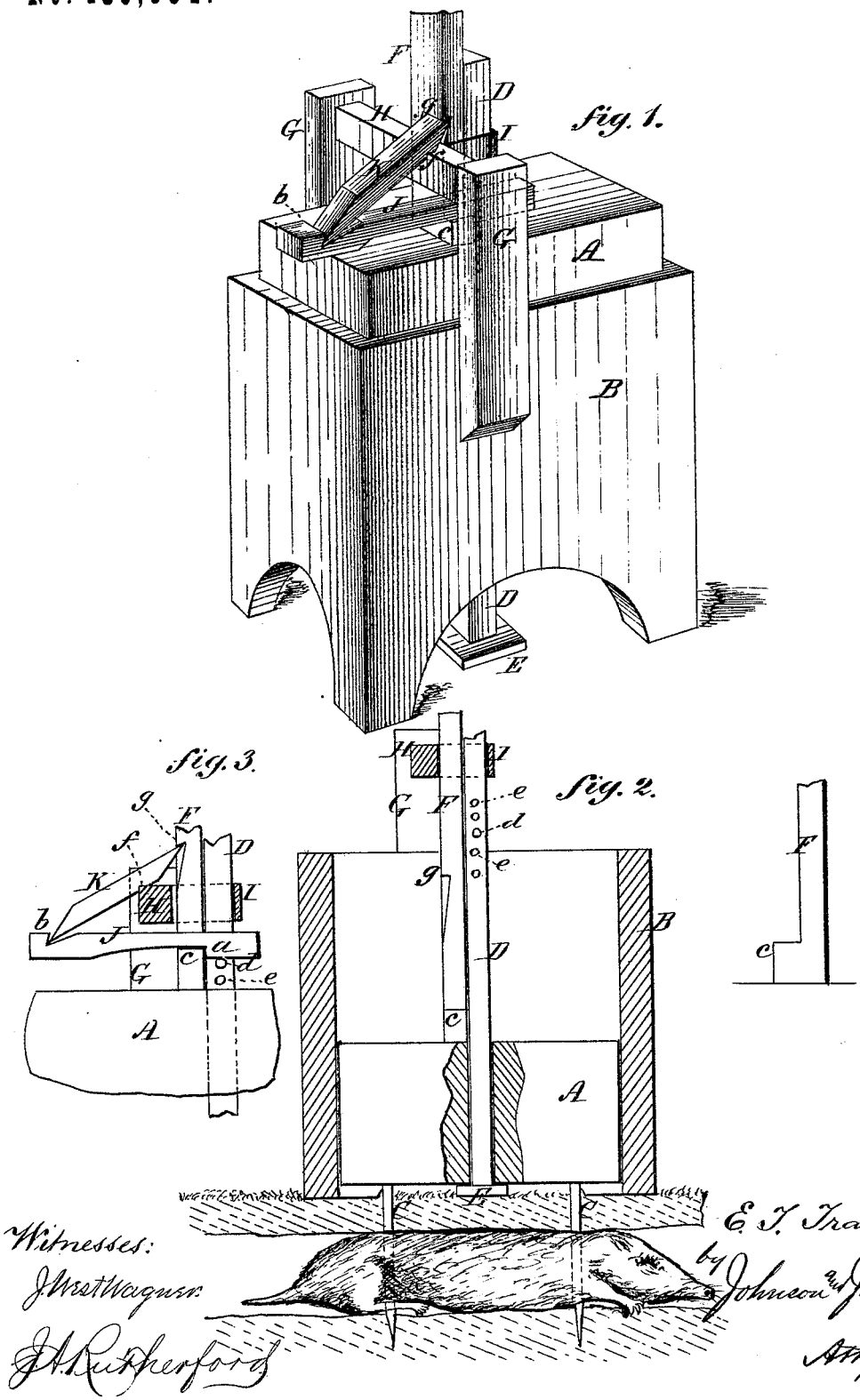

EDWARD T. TRANSOU, OF HUMBOLDT, TENNESSEE.

IMPROVEMENT IN MOLE-TRAPS.

Specification forming part of Letters Patent No. 180,964, dated August 8, 1876; application filed July 10, 1876.

*To all whom it may concern:*

Be it known that I, EDWARD T. TRANSOU, of Humboldt, in the county of Gibson and State of Tennessee, have invented certain new and useful Improvements in Mole-Traps, of which the following is a specification:

In my improved mole-trap the drop spike-block is suspended above the box-frame, with the tripping devices out of the way of being tripped by small animals or chickens, and the lift-bar is arranged to pass centrally through the drop spike-block, and alongside of the vertical rod, by which said block is suspended from a gallows-frame by means of a horizontal notched bar, one end of which interlocks with a side projection or shoulder on the drop spike-block bar, in position to be tripped by a pin on the lift-bar, while the other end of the notched bar interlocks with the lower end of an inclined trigger, which, resting by a notch upon the gallows-bar, has its upper end entering a notch in the drop spike-block bar, so that the elevation of the lift-bar will instantly trip the horizontal notched bar, and, releasing the trigger, let the spike-block fall, so that its teeth, entering the mole-run, will pierce the mole and kill or pin him in the earth.

The trap is compact, cheaply made, with the tripping parts at the top, and the drop spike-block protected from accidents from fowls or small animals. It is convenient to carry, and can be set close to a fence or wall. A guide-strap on the gallows-frame embraces the lift and the drop spike-block bars, to keep them together, and, in connection with the box, forms the guide for the drop spike-block, while the lift-bar has its guides both in the drop spike-block and the guide-strap; and by this construction I am enabled to place the tripping-bar alongside of both the lift and the drop spike-block bars, and to obtain the top tripping-support for said block.

In the accompanying drawings, Figure 1 represents a view, in perspective, of a mole-trap embracing my invention, the trap being in the position when set over the mole-run; Fig. 2, a vertical section with the drop spike-block tripped, as it is in piercing the mole; and Fig. 3, a sectional view, showing the position of the parts as in Fig. 1.

The drop spike-block A is fitted within a box, B, open at top and bottom, and scalloped out at its four sides to form feet, which enter the ground and hold it in position. It is about five by ten inches square, and twelve inches high, and can be set upon a potato or cotton ridge, or any desired place. The drop spike-block rises partly above the open top of the box when set, and it is provided on its under surface, near each end, with three or more long spikes or piercing-rods, C, which, when the block is tripped, enter the ground and kill or pierce the mole in his run, the fall and weight of the block being sufficient for that purpose. The lift-bar D passes vertically through an opening in the drop spike-block, and has a foot-piece, E, which rests upon the mole-run, so that it will be raised by the swelling ridge made by the mole on the surface of the ground.

The drop spike-block has a bar, F, which rises from its top by the side of the lift-bar, so that the two bars form a guide to each other. A gallows-frame, G, rises from the sides of the box A, having the horizontal bar H, and a strap, I, extends from one side, and embraces the vertical bars D F, to hold them in position, and form a guideway for their vertical movement. This gallows-frame, in connection with the drop spike-block bar, forms the means for the adjustment and support of the tripping device, which consists of a horizontal double-notched bar, J, having the notches $a$ and $b$ on its opposite sides. The notch $a$ rests upon a shoulder, $c$, on the drop spike-bar F, the end of the bar extending across the side of the lift-bar D, in position to be acted upon by a pin, $d$, inserted into any one of a series of holes, $e$, in the lift-bar, so that when the latter is raised by the mole pressing under its foot E, the notched bar J will be released from the holding-shoulder.

A trigger, K, with inclined ends, is placed in the notch $b$ in an inclined position, and, resting by a V-notch, $f$, upon the cross-bar H, enters a notch, $g$, in the drop spike-block bar, and thus sustains the latter in its set position, so that the movement of the lift-bar to free the notched bar will instantly trip the trigger and let the drop fall.

By this construction the tripping devices are arranged at the top of the trap, with the gallows-bar forming the support, and are, therefore, out of the way of accident by small animals which may run by the trap. This arrangement, moreover, brings the tripping devices compactly together above and near the guide-strap for the moving bars; allows of the arrangement of the lift-bar through a central guide opening in the drop spike-block, and the placing of the bars beside each other, so that they form guides to each other. I also dispense with spring and cord connections of the tripping devices, as the short double-notched bar lies, when set, just over top of the drop spike-block, and the trigger rests just above it in an inclined position upon the gallows-bar, in line with the notch-bar and the guide-strap. The gallows-frame forms a convenient handle by which to carry and set the trap. The trap can be set among rose-bushes or shrubbery of any kind, plants, or flower-beds.

The trigger devices are made of wood, and they do not project outside of the box, or the space on which the spike-block falls.

In setting the trap, select a straight place in the mole-run; press down a small place so that the foot E of the lift-bar will rest upon the surface, when the tripping device is set; push the spikes as far down as they will go, and work them up and down a few times, so that they will meet with no obstruction before they strike the mole, falling into the same holes made for them; then raise the drop spike-block and set it by the tripping devices, as before stated, the pin $d$ being passed into the hole in the lift-bar, so that only a small movement of the latter will be sufficient to trip the trigger and let the drop spike-block fall the moment the mole passes beneath the foot, so as to raise it and lift the notch $a$ off the shoulder $c$ of the drop spike-block bar.

I claim—

1. The combination, with the lift and drop spike-block bars D F, the latter having the shoulder $c$ and the notch $g$, and the former the pin $d$, and both passing through the guide-strap I, of the double-notched bar J $a$ $b$ and the trigger K, having its support upon the cross-bar, substantially as and for the purpose herein set forth.

2. The combination, with the box-frame B, the gallows-frame G H, and the guide-strap I, carried by said frame, of the bars D F, the spike-block A, and the tripping device J K, all constructed and combined for use as shown and described.

In testimony whereof I have affixed my signature in the presence of two witnesses.

EDWARD T. TRANSOU.

Witnesses:
 M. H. JOHNSON,
 J. P. JOHNSON.